US009542491B2

(12) United States Patent
Chisalita

(10) Patent No.: US 9,542,491 B2
(45) Date of Patent: Jan. 10, 2017

(54) UTILIZING KEYSTROKE LOGGING TO DETERMINE ITEMS FOR PRESENTATION

(71) Applicant: MICROSOFT CORPORATION, Redmond, WA (US)

(72) Inventor: Ciprian Chisalita, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 13/715,173

(22) Filed: Dec. 14, 2012

(65) Prior Publication Data

US 2014/0172812 A1 Jun. 19, 2014

(51) Int. Cl.
*G06F 17/30* (2006.01)
(52) U.S. Cl.
CPC ..... *G06F 17/30864* (2013.01); *G06F 17/3053* (2013.01); *G06F 17/30637* (2013.01)
(58) Field of Classification Search
CPC .................... G06F 17/30864; G06F 17/30867; G06F 17/3053
USPC ................. 707/706, 723, 770, 772
See application file for complete search history.

(56) References Cited

U.S. PATENT DOCUMENTS

| 7,890,526 B1 | 2/2011 | Brewer et al. |
| 8,135,729 B2 | 3/2012 | Brewer et al. |
| 8,745,018 B1* | 6/2014 | Singleton et al. ............ 707/705 |
| 2005/0065774 A1 | 3/2005 | Doganata et al. |
| 2006/0031673 A1* | 2/2006 | Beck et al. .................... 713/164 |
| 2007/0022287 A1* | 1/2007 | Beck et al. .................... 713/164 |
| 2007/0088686 A1* | 4/2007 | Hurst-Hiller et al. ............ 707/4 |
| 2009/0228353 A1 | 9/2009 | Achan et al. |
| 2009/0234811 A1 | 9/2009 | Jamil et al. |
| 2010/0106703 A1 | 4/2010 | Cramer |
| 2010/0153380 A1* | 6/2010 | Garg et al. .................... 707/723 |
| 2010/0217756 A1 | 8/2010 | Guha |
| 2010/0241663 A1* | 9/2010 | Huang et al. ................. 707/770 |

(Continued)

OTHER PUBLICATIONS

Kohei Nasaka et al., A Keystroke Logger Detection Using Keyboard-Input-Related API Monitoring, 2011, IEEE, 651-656.*

(Continued)

*Primary Examiner* — Jean B Fleurantin
(74) *Attorney, Agent, or Firm* — Jessica Meyers; Tom Wong; Micky Minhas

(57) ABSTRACT

Systems, methods, and computer-readable storage media are provided for utilizing keystroke logging information to determine items (e.g., search results and/or advertisements) for presentation in response to an input search query. The utilized keystroke logging information is captured contemporaneously with input of the submitted query terms/content of the search query. That is, the utilized keystroke logging information is captured during a single search query input session measured, for instance, between execution of a first search query and execution of a second search query, or between engagement with a search query input region and execution of a search query. In this way, information that may be gleaned about a user's intent based upon query reformulations (e.g., query term deletions, additions, spelling corrections, and the like) and/or actions taken with respect to query formation (e.g., pasting actions) may be utilized to provide relevant items in response to the search query.

20 Claims, 4 Drawing Sheets

(56) References Cited

U.S. PATENT DOCUMENTS

2011/0208715 A1   8/2011   Ni et al.
2012/0130969 A1   5/2012   Wong et al.

OTHER PUBLICATIONS

Lu, et al., "Extending a Web Browser with Client-Side Mining", In Proceedings of the 5th Asia-Pacific Web Conference on Web Technologies and Applications, Apr. 23, 2003, 12 pages.
Rieh, et al., "Analysis of Multiple Query Reformulations on the Web: The Interactive Information Retrieval Context", In International Journal of Information Processing and Management, vol. 42, Issue 3, May 2006, 18 pages.
Diriyey, et al., "Interactive Search Support for Difficult Web Queries", In Proceedings of the 34th European Conference on Advances in Information Retrieval, Apr. 1, 2012, 12 pages.
"Search Engine Projects", Published on: Feb. 2, 2011, all pages. Available at: http://iprojectideas.blogspot.in/2011/02/search-engine-projects.html.
International Preliminary Report on Patentability dated Mar. 18, 2015 in Application No. PCT/US2013/074987, 6 pages.
"Second Written Opinion Issued in PCT Application No. PCT/US2013/074987", Mailed Date: Nov. 19, 2014, 5 Pages.
"International Search Report & Written Opinion for PCT Patent Application No. PCT/US2013/074987", Mailed Date: Jul. 24, 2014, Filed Date: Dec. 13, 2013, 8 Pages.
Hu, et al., "Mining Query Subtopics from Search Log Data", In Proceedings of the 35th International ACM SIGIR Conference on Research and Development in Information Retrieval, Aug. 12, 2012, pp. 305-314.

\* cited by examiner

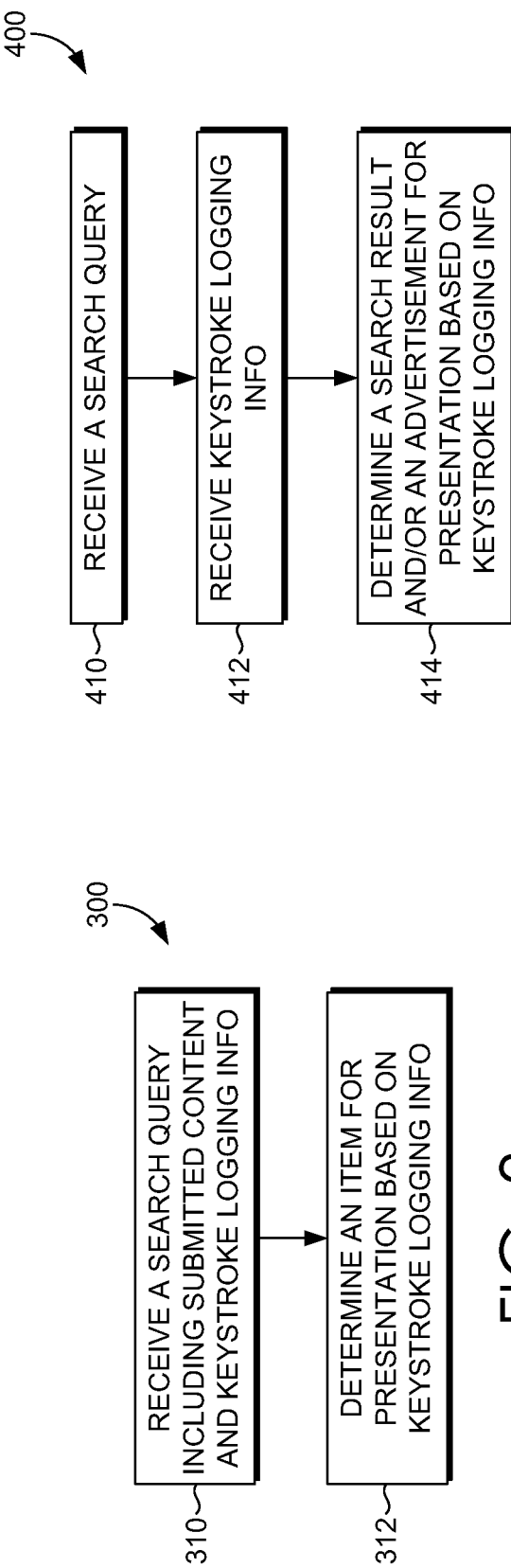

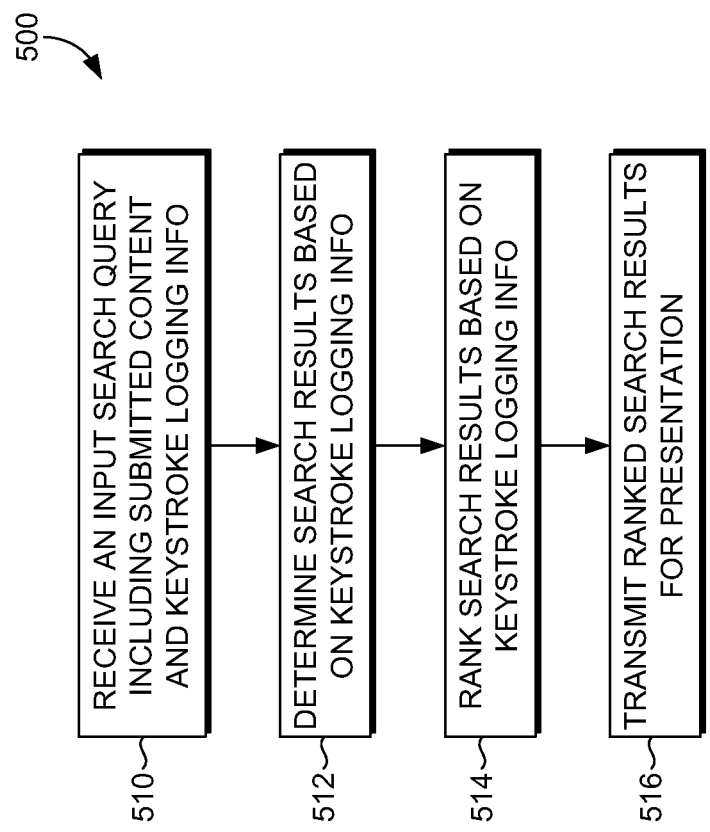

US 9,542,491 B2

UTILIZING KEYSTROKE LOGGING TO DETERMINE ITEMS FOR PRESENTATION

BACKGROUND OF THE INVENTION

Keyword based search engines are in widespread use today for information retrieval, such as Web-based information retrieval. Users typically enter queries through a search interface, for instance, a search query input region associated with a search engine home page or a search toolbar. One problem with keyword-based search engines and searching on the Web is that it is common for irrelevant results to be returned to the user. One reason for this is that most search engines utilize an approach to search where the user submits one or more query terms and the search engine returns ranked results based on the submitted query terms alone. Query input more reflective of actual user intent generates more relevant search results. However, users are often unsure how best to express their intent and/or don't realize that the query terms they are inputting may have multiple alternate meanings.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In various embodiments, systems, methods, and computer-readable storage media are provided for utilizing keystroke logging information that is captured contemporaneously with input of the submitted content of a search query to determine items (e.g., search results and/or advertisements) for presentation in response to the input search query. That is, keystroke logging information captured during a single search query input session (i.e., between execution of a first search query and execution of a second search query or between engagement with a search query input region and execution of a search query) is utilized in determining (e.g., identifying and/or ranking) items for presentation in response to the query. In this way, information that may be gleaned about a user's intent based upon query reformulations (for instance, query term additions or deletions) and/or actions taken with respect to query formation (e.g., pasting actions) may be utilized to provide more relevant items in response to the query.

BRIEF DESCRIPTION OF THE DRAWINGS

The present invention is illustrated by way of example and not limitation in the accompanying figures in which like reference numerals indicate similar elements and in which:

FIG. 3 is a flow diagram showing an exemplary method for utilizing keystroke logging to determine items for presentation, in accordance with an embodiment of the present invention;

FIG. 4 is a flow diagram showing another exemplary method for utilizing keystroke logging to determine items for presentation, in accordance with an embodiment of the present invention; and FIG. 5 is a flow diagram showing yet another exemplary method for utilizing keystroke logging to determine items for presentation, in accordance with an embodiment of the present invention.

DETAILED DESCRIPTION

Figure 1:
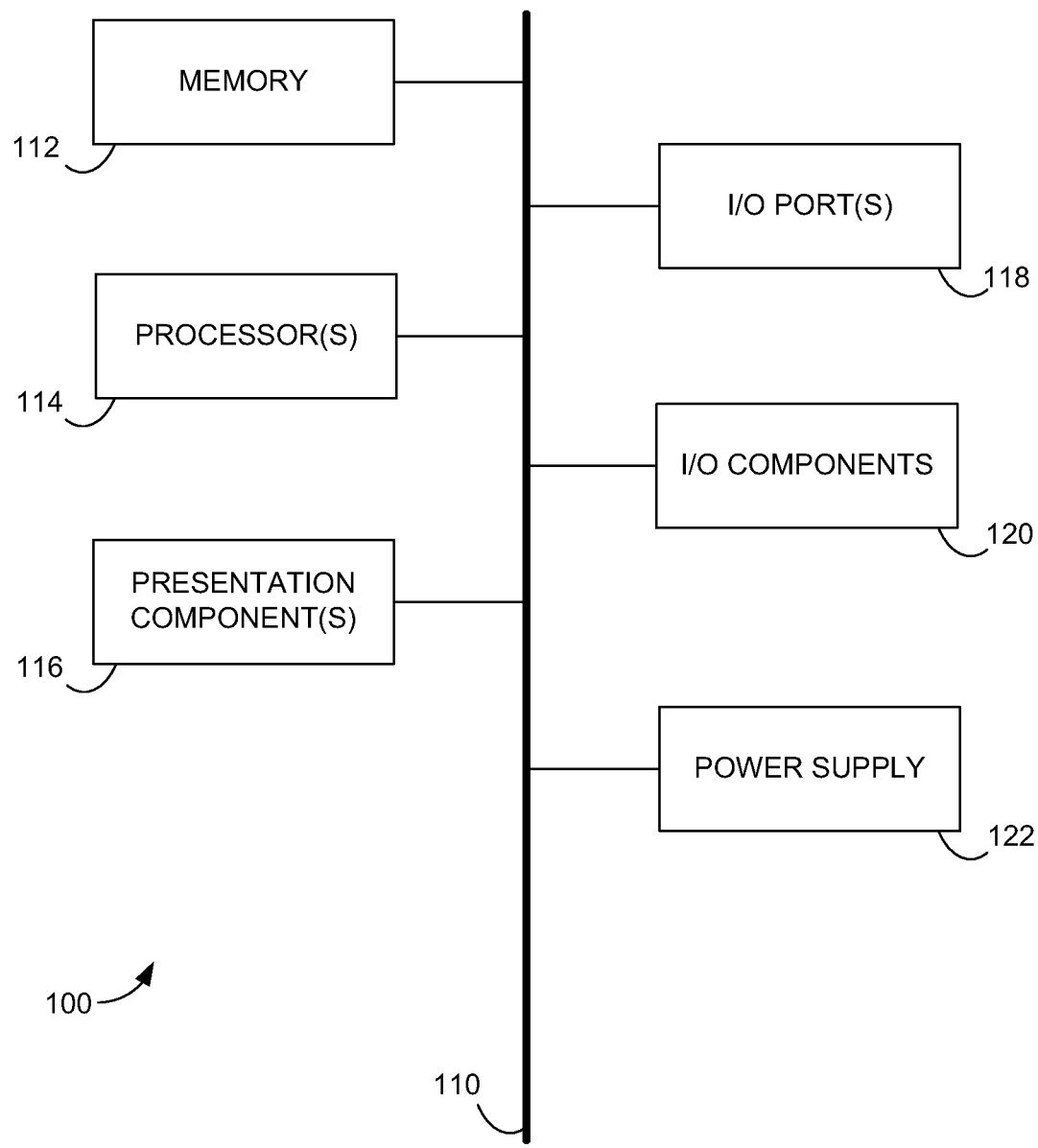
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various aspects of the technology described herein are generally directed to systems, methods, and computer-readable storage media for utilizing keystroke logging information to determine items (e.g., search results and/or advertisements) for presentation in response to an input search query. The utilized keystroke logging information is captured contemporaneously with input of the submitted query terms/content of the search query. In other words, the utilized keystroke logging information is captured during a single search query input session measured, for instance, between execution of a first search query and execution of a second search query, or between engagement with a search query input region and execution of a search query. In this way, information that may be gleaned about a user's intent based upon query reformulations (e.g., query term deletions, additions, spelling corrections, and the like) and/or actions taken with respect to query formation (e.g., pasting actions) may be utilized to provide relevant items in response to the search query.

Accordingly, one embodiment of the present invention is directed to one or more computer-readable storage media storing computer-useable instructions that, when used by one or more computing devices, cause the one or more computing devices to perform a method for utilizing keystroke logging to determine items for presentation. The method includes receiving a search query including submitted content (i.e., query terms) and keystroke logging information, and determining at least one item for presentation in response to the search query based, at least in part, on the keystroke logging information. The keystroke logging information is captured contemporaneously with input of the search query, that is, between execution of a first search query and execution of a second search query or between engagement with a search query input region and execution of a search query.

In another embodiment, the present invention is directed to a method being performed by one or more computing devices including at least one processor, the method for utilizing keystroke logging to determine items for presentation. The method includes receiving a search query, receiving keystroke logging information associated with the search query, and determining at least one of a search result and an advertisement for presentation in response to the received search query. The keystroke logging information is captured contemporaneously with input of the search query (i.e., between execution of a first search query and execution of a second search query or between engagement with a search query input region and execution of a search query) and the at least one of the search result and the advertisement is determined, at least in part, based upon the keystroke logging information.

In yet another embodiment, the present invention is directed to a system for utilizing keystroke logging to determine items for presentation. The system includes a search engine having one or more processors and one or more computer-readable storage media, and a data store coupled with the search engine. The search engine is configured to receive an input search query including submitted content and keystroke logging information; determine a plurality of potential search results based, at least in part, on the keystroke logging information; rank at least a portion of the determined plurality of potential search results based, at least in part, on the keystroke logging information; and transmit at least a portion of the ranked plurality of potential search results for presentation in response to the received search query. The keystroke logging information is captured contemporaneously with input of the search query, that is, between execution of a first search query and execution of a second search query or between engagement with a search query input region and execution of a search query.

Having briefly described an overview of embodiments of the present invention, an exemplary operating environment in which embodiments of the present invention may be implemented is described below in order to provide a general context for various aspects of the present invention. Referring to the figures in general and initially to FIG. 1 in particular, an exemplary operating environment for implementing embodiments of the present invention is shown and designated generally as computing device 100. The computing device 100 is but one example of a suitable computing environment and is not intended to suggest any limitation as to the scope of use or functionality of embodiments of the invention. Neither should the computing device 100 be interpreted as having any dependency or requirement relating to any one component nor any combination of components illustrated.

Embodiments of the invention may be described in the general context of computer code or machine-useable instructions, including computer-useable or computer-executable instructions such as program modules, being executed by a computer or other machine, such as a personal data assistant or other handheld device. Generally, program modules including routines, programs, objects, components, data structures, and the like, and/or refer to code that performs particular tasks or implements particular abstract data types. Embodiments of the invention may be practiced in a variety of system configurations, including hand-held devices, consumer electronics, general-purpose computers, more specialty computing devices, and the like. Embodiments of the invention may also be practiced in distributed computing environments where tasks are performed by remote-processing devices that are linked through a communications network.

With continued reference to FIG. 1, the computing device 100 includes a bus 110 that directly or indirectly couples the following devices: a memory 112, one or more processors 114, one or more presentation components 116, one or more input/output (I/O) ports 118, one or more I/O components 120, and an illustrative power supply 122. The bus 110 represents what may be one or more busses (such as an address bus, data bus, or combination thereof). Although the various blocks of FIG. 1 are shown with lines for the sake of clarity, in reality, these blocks represent logical, not necessarily actual, components. For example, one may consider a presentation component such as a display device to be an I/O component. Also, processors have memory. The inventor hereof recognizes that such is the nature of the art, and reiterates that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

The computing device 100 typically includes a variety of computer-readable media. Computer-readable media may be any available media that is accessible by the computing device 100 and includes both volatile and nonvolatile media, removable and non-removable media. Computer-readable media comprises computer storage media and communication media; computer storage media excluding signals per se. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media, on the other hand, embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 112 includes computer-storage media in the form of volatile and/or nonvolatile memory. The memory may be removable, non-removable, or a combination thereof. Exemplary hardware devices include solid-state memory, hard drives, optical-disc drives, and the like. The computing device 100 includes one or more processors that read data from various entities such as the memory 112 or the I/O components 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative components include a microphone, joystick, game pad, satellite dish, scanner, printer, wireless device, and the like. Aspects of the subject matter described herein may be described in the general context of computer-executable instructions, such as program modules, being executed by a mobile device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Furthermore, although the term "search engine" is used herein, it will be recognized that this term may also encompass a server, a Web browser, a set of one or more processes distributed on one or more computers, one or more stand-alone storage devices, a set of one or more other computing or storage devices, a combination of one or more of the above, and the like.

As previously mentioned, embodiments of the present invention are generally directed to systems, methods, and computer-readable storage media for utilizing keystroke logging information to determine items (e.g., search results and/or advertisements) for presentation in response to an input search query. The utilized keystroke logging information is captured contemporaneously with input of the submitted query terms/content of the search query. In other words, the utilized keystroke logging information is captured during a single search query input session measured, for instance, between execution of a first search query and execution of a second search query, or between engagement with a search query input region and execution of a search query. In this way, information that may be gleaned about a user's intent based upon query reformulations (e.g., query term deletions, additions, spelling corrections, and the like) and/or actions taken with respect to query formation (e.g., pasting actions) may be utilized to provide relevant items in response to the search query.

Figure 2:
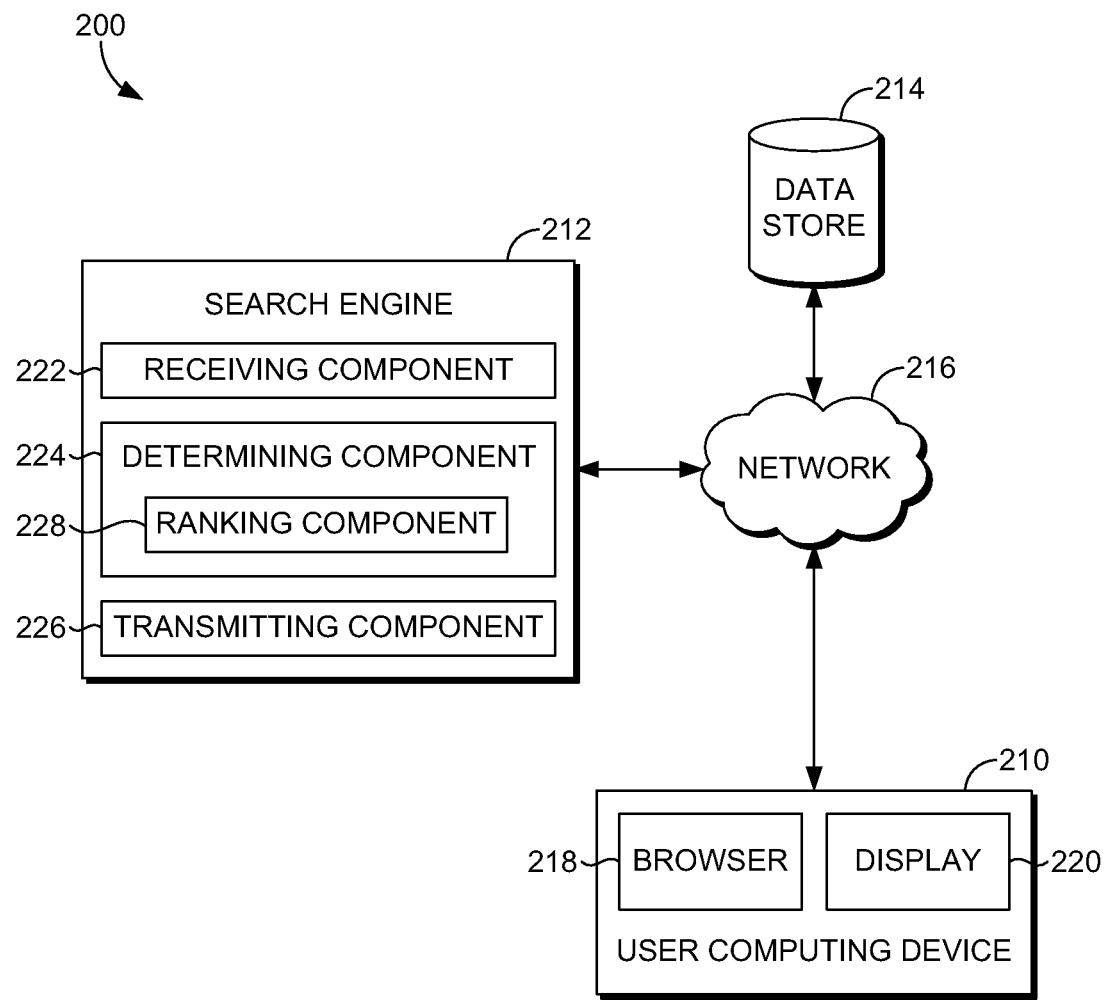
FIG. 2 is a block diagram of an exemplary computing system in which embodiments of the invention may be employed.

Referring now to FIG. 2, a block diagram is provided illustrating an exemplary computing system 200 in which embodiments of the present invention may be employed. Generally, the computing system 200 illustrates an environment in which, in addition to the submitted content (query terms) of a search query, keystroke logging information is contemporaneously captured and utilized to determine at least one item (e.g., a search result and/or an advertisement) to present in response to the search query. Among other components not shown, the computing system 200 generally includes a user computing device 210, a search engine 212 and a data store 214, all in communication with one another via a network 216. The network 216 may include, without limitation, one or more local area networks (LANs) and/or wide area networks (WANs). Such networking environments are commonplace in offices, enterprise-wide computer networks, intranets and the Internet. Accordingly, the network 216 is not further described herein.

It should be understood that any number of user computing devices 210 and/or search engines 212 may be employed in the computing system 200 within the scope of embodiments of the present invention. Each may comprise a single device/interface or multiple devices/interfaces cooperating in a distributed environment. For instance, the search engine 212 may comprise multiple devices and/or modules arranged in a distributed environment that collectively provide the functionality of the search engine 212 described herein. Additionally, other components/modules not shown also may be included within the computing system 200.

In some embodiments, one or more of the illustrated components/modules may be implemented as stand-alone applications. In other embodiments, one or more of the illustrated components/modules may be implemented via the user computing device, 210, the search engine 212, or as an Internet-based service. It will be understood by those of ordinary skill in the art that the components/modules illustrated in FIG. 2 are exemplary in nature and in number and should not be construed as limiting. Any number of components/modules may be employed to achieve the desired functionality within the scope of embodiments hereof. Further, components/modules may be located on any number of search engines and/or user computing devices. By way of example only, the search engine 212 might be provided as a single computing device (as shown), a cluster of computing devices, or a computing device remote from one or more of the remaining components.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The user computing device 210 may include any type of computing device, such as the computing device 100 described with reference to FIG. 1, for example. Generally, the user computing device 210 includes a browser 218 and a display 220. The browser 218, among other things, is configured to render search engine home pages (or other online landing pages), and render search engine results pages (SERPs) in association with the display 220 of the user computing device 210. The browser 218 is further configured to receive user input of requests for various web pages (including search engine home pages), receive user input search queries (generally input via a user interface presented on the display 220 and permitting alpha-numeric and/or textual input into a designated search input region) and to receive content for presentation on the display 220, for instance, from the search engine 212. It should be noted that the functionality described herein as being performed by the browser 218 may be performed by any other application, application software, user interface, or the like capable of rendering Web content. Any and all such variations, and any combination thereof, are contemplated to be within the scope of embodiments of the present invention.

The search engine 212 of FIG. 2 is configured to receive search queries and keystroke logging information, determine items (e.g., search results and advertisements) for presentation in response to received search queries and/or keystroke logging information, and transmit determined items (for instance, to the user computing device 210) for presentation, e.g., in association with a SERP. As illustrated, the search engine 212 includes a receiving component 222, a determining component 224, and a transmitting component 226. The illustrated search engine 212 also has access to a data store 214. The data store 214 is configured to store information pertaining to search queries, keystroke logging information, and items configured for presentation in response to an input search query (e.g., including, but not limited to search results and/or advertisements. In various embodiments, such information may include, without limitation, search query logs, search result determining algorithms, keystroke logging cues and data, advertisements, and the like. In embodiments, the data store 214 is configured to be searchable for one or more of the items stored in association therewith. It will be understood and appreciated by those of ordinary skill in the art that the information stored in association with the data store 214 may be configurable and may include any information relevant to search queries, keystroke logging information, search results, and/or advertisements. The content and volume of such information are not intended to limit the scope of embodiments of the present invention in any way. Further, though illustrated as a single, independent component, the data store 214 may, in fact, be a plurality of storage devices, for instance a database cluster, portions of which may reside in association with the search engine 212, the user computing device 210, another external computing device (not shown), and/or any combination thereof.

The receiving component 222 of the search engine 212 is configured to receive requests for presentation of search results (e.g., algorithmically-identified search results) that satisfy an input search query. Typically, such a request is received via a browser (or other application software or user interface) associated with a user computing device, for instance, the browser 218 associated with the user computing device 210. It should be noted, however, that embodiments of the present invention are not limited to users inputting a search query into a traditional query-input region of a screen display.

In accordance with embodiments of the present invention, received input search queries include submitted content and keystroke logging information. As utilized herein, "submitted content" refers to the textual information comprising the input search query, that is, the query term(s). In embodiments, the submitted content is that content which is visibly presented in the query-input region. In embodiments, the submitted content includes the query term(s) comprising the input search query but does not include any formatting data (e.g., capital letters, font size, font type, and the like), even though such formatting data may be visibly presented. In such embodiments, formatting data is captured as keystroke logging information, as more fully described below.

Keystroke logging (often referred to as "keylogging") is the action of tracking or logging keys struck on a keyboard. Thus, as utilized herein, "keystroke logging information" is information about those keys a user has stuck on a keyboard in formulating an input search query. Keystroke logging information may or may not be discernable from the submitted content. Keystroke logging information that is discernable from the submitted content includes, without limitation, formatting data such as capital letters, font sizes, font types, and the like. Keystroke logging information that is not discernable from the submitted content includes, without limitation, indications of query processing operations (e.g., deleting query terms, adding query terms, spelling corrections, content pasting, and the like) and indicators of a source from which one or more query terms is taken (e.g., a URL from which a query term is copied and pasted into the query-input region).

It will be understood and appreciated by those of ordinary skill in the art that advances in technology continue to enable users to input information and receive responses to queries with limited interaction with an actual keyboard. Embodiments of the present invention thus are intended to include keystroke logging information that is input without direct keyboard interaction. For instance, voice input is increasingly utilized to allow users to input information without interaction with a keyboard. Query formulation and reformulation actions, however, still take place with such input mechanisms. For instance, a user may request that a previously spoken query term be deleted and replaced with another keyword. Even though such actions are verbal and do not require a keyboard, information concerning such actions are included within the definition of "keystroke logging information" as that term is utilized herein. Keystroke logging methods, both hardware and software-based, are known to those of ordinary skill in the art and, accordingly, are not further described herein.

In accordance with embodiments herein, keystroke logging information is captured contemporaneously with input of the search query, that is, with input of the submitted content/query terms. In other words, the keystroke logging information captured in accordance with embodiments of the present invention originates (based upon user action) during the same period of time as origination of the submitted content. Thus, the time frame qualifying as the "same" time frame as origination of the submitted content is the time frame comprising a single search query session measured, for instance, between execution of a first search query and execution of a second search query, or between engagement with a search query input region and execution of a search query. In this way, information regarding query reformulations and/or actions taken by the user with respect to query formulation is captured.

Keystroke logging information and submitted content/query terms may be received by the receiving component 222 as separate files or as a single file, the keystroke logging information being appended to the submitted content and/or included as metadata of the submitted content. Thus, the receiving component 222 is configured to receive search queries including submitted content and keystroke logging information, and is also configured to receive search queries including submitted content/query terms and to separately receive keystroke logging information captured contemporaneously with the search query. Any and all such variations, and any combination thereof, are contemplated to be within the scope of embodiments of the present invention.

By way of example, suppose a user engages with a search query input region of a search interface and pastes the phrase "The Microsoft Office" that was copied from a Web source. (Note that MICROSOFT OFFICE is a registered trademark of Microsoft Corporation of Redmond, Wash.) Further suppose the user then deletes the word "The" and submits the query (e.g., presses the "enter" button on a keyboard or selects a search initiation icon). In this example, and utilizing a prior art search engine that does not take into account formatting information in determining search results, the query terms "microsoft office" are all that is utilized by the search engine in determining items for presentation. However, in accordance with embodiments of the present invention, the search engine may receive the query "microsoft office" as well as the following additional information: (1) the query is a pasted query, (2) the URL source of the pasted query, (3) that the query used to contain the word "The," and (4) the fact that both query terms are capitalized (which may signal that the user is searching for a name). This additional information may then be utilized (as more fully described below) in determining items for presentation in response to the received query that are more relevant and more accurately reflect the user's intent than would be determined utilizing the exemplary prior art search engine.

As another example, suppose a user engages with a search query input region of a search interface and inputs the phrase "Microsoft Office." The user then changes her mind and decides she is really only interested in items related to a word processing program, deletes "Microsoft Office" and inputs "Word." (Note that MICROSOFT OFFICE and WORD are registered trademarks of Microsoft Corporation of Redmond, Wash.) The user then submits the query. In this example, and utilizing a prior art search engine that does not take into account formatting information in determining search results, the query term "word" is all that is utilized by the search engine in determining items for presentation. From this query alone, it is very difficult for the search engine to understand the user's intent. However, in accordance with embodiments of the present invention, the search engine may receive not only the query "word" but also the following additional information: (1) that the query used to contain the terms "Microsoft Office" (which is an entity and helpful context), and (2) that the submitted content/query term is capitalized (which aids in categorizing it as a name/entity). This additional information may then be utilized (as more fully described below) in determining items for presentation in response to the received query that are more relevant and more accurately reflect the user's intent than would be determined utilizing the exemplary prior art search engine.

As yet another example, suppose a user engages with a search query input region of a search interface and inputs the phrase "Microsoft Office." (Note that MICROSOFT OFFICE is a registered trademark of Microsoft Corporation of Redmond, Wash.) The user then changes her mind deletes "Microsoft Office" and inputs "bestbuy." (Note that BEST BUY is a registered trademark of BBY Solutions, Inc. Corporation of Richfield Minn.) The user then submits the query. In this example, and utilizing a prior art search engine that does not take into account formatting information in determining search results, the query term "bestbuy" is all that is utilized by the search engine in determining items for presentation. However, in accordance with embodiments of the present invention, the search engine may receive not only the query "bestbuy" but also receive additional information indicating that the query used to contain the terms "Microsoft Office" (which is an entity and helpful context). This additional information may then be utilized (as more fully described below) in determining items for presentation in response to the received query that are more relevant and more accurately reflect the user's intent than would be determined utilizing the exemplary prior art search engine.

Returning now to FIG. 2, the determining component 224 is configured to utilize the submitted content/query terms and/or the keystroke logging information to determine one or more items for presentation in response to the search query. In embodiments, the keystroke logging information is utilized, at least in part, to determine at least one item for presentation. Items may include any content configured for presentation in association with a display, for instance, the display 220 of the user computing device 210 and may include, without limitation, search results (e.g., algorithmically determined search results) and advertisements (e.g., display advertisements, banner advertisements, and the like).

In accordance with embodiments of the present invention, the determining component 224 is configured to utilize keystroke logging information to determine items for presentation in response to a search query by identifying items for presentation and/or by ranking potential items for presentation. Thus, the determining component 224 includes a ranking component 228 that is configured to utilize keystroke logging information to rank identified potential items with respect to one another.

With continued reference to FIG. 2, the transmitting component 226 is configured to transmit at least a portion of identified items for presentation, for instance, on a search engine results page (SERP). In embodiments, at least one of the transmitted items is determined (utilizing the determining component 224) using keystroke logging information.

Turning now to FIG. 3, a flow diagram is illustrated showing an exemplary method 300 for utilizing keystroke logging to determine items for presentation, in accordance with an embodiment of the present invention. As indicted at block 310, a search query is received (e.g., by the receiving component 222 of the search engine 212 of FIG. 2), the search query including submitted content and keystroke logging information, the keystroke logging information being captured contemporaneously with input of the search query. As indicated at block 312, at least one item (for instance, an advertisement and/or a search result) is determined (e.g., utilizing the determining component 224 of the search engine 212 of FIG. 2) for presentation based, at least in part, on the keystroke logging information. As previously set forth, the keystroke logging information may or may not be discernable from the submitted content.

With reference now to FIG. 4, a flow diagram is illustrated showing another exemplary method 400 for utilizing keystroke logging to determine items for presentation, in accordance with an embodiment of the present invention. Initially, as indicated at block 410, a search query is received (e.g., by the receiving component 222 of the search engine 212 of FIG. 2). As indicated at block 412, also received is keystroke logging information, the keystroke logging information being captured contemporaneously with input of the search query. As indicated at block 414, at least one of a search result and an advertisement is determined for presentation (e.g., utilizing the determining component 224 of the search engine 212 of FIG. 2) in response to the received search query based, at least in part, on the keystroke logging information. As previously set forth, the keystroke logging information may or may not be discernable from the submitted content.

With reference now to FIG. 5, a flow diagram is illustrated showing an exemplary method 500 for utilizing keystroke logging to determine items for presentation, in accordance with an embodiment of the present invention. As indicated at block 510, an input search query is received, for instance, by the receiving component 222 of the search engine 212 of FIG. 2. The input search query includes submitted content (e.g., query terms) and keystroke logging information which may or may not be discernable from the submitted content. The keystroke logging information is captured contemporaneously with input of the search query. As indicated at block 512, a plurality of potential search results is determined (e.g., utilizing the determining component 224 of the search engine 212 of FIG. 2) based, at least in part, on the keystroke logging information. As indicated at block 514, at least a portion of the determined plurality of potential search results is ranked (e.g., utilizing the ranking component 228), at least in part, based upon the keystroke logging information. At least a portion of the ranked plurality of potential search results is transmitted (for instance, utilizing the transmitting component 226 of the search engine 212 of FIG. 2) for presentation in response to the received search query. This is indicated at block 516.

As can be understood, embodiments of the present invention provide systems, methods, and computer-readable storage media for, among other things, utilizing keystroke logging information to determine items (for instance, search results and/or advertisements) for presentation in response to an input search query. The utilized keystroke logging information is captured contemporaneously with input of the submitted query terms/content of the search query. In other words, the utilized keystroke logging information is captured during a single search query input session measured, for instance, between execution of a first search query and execution of a second search query, or between engagement with a search query input region and execution of a search query. Utilizing the systems and methods herein presented information that may be gleaned about a user's intent based upon query reformulations and/or actions taken with respect to query formation may be utilized to provide relevant items in response to the search query.

The present invention has been described in relation to particular embodiments, which are intended in all respects to be illustrative rather than restrictive. Alternative embodiments will become apparent to those of ordinary skill in the art to which the present invention pertains without departing from its scope.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

It will be understood by those of ordinary skill in the art that the order of steps shown in the methods 300 of FIG. 3, 400 of FIG. 4, and 500 of FIG. 5 is not meant to limit the scope of the present invention in any way and, in fact, the steps may occur in a variety of different sequences within embodiments hereof. Any and all such variations, and any combination thereof, are contemplated to be within the scope of embodiments of the present invention.

What is claimed is:

1. One or more computer-readable storage hardware device storing computer-useable instructions that, when used by one or more computing devices, cause the one or more computing devices to utilize keystroke logging to determine items for presentation, the instructions configured to:
   receive a search query including submitted content and keystroke logging information, the keystroke logging information being captured between engagement with a search query input region and execution of a search query; and
   determine at least one item for presentation in response to the search query based, at least in part, on the keystroke logging information, the at least one item comprising a search result, the determining comprising:
      ranking a plurality of potential search results in response to the search query based, at least in part, on the keystroke logging information; and
      determining the at least one item for presentation based on the ranking.

2. The one or more computer-readable storage hardware device of claim 1, wherein the keystroke logging information is not discernable from the submitted content.

3. The one or more computer-readable storage hardware device of claim 2, wherein the keystroke logging information includes at least one indication of a query processing operation.

4. The one or more computer-readable storage hardware device of claim 2, wherein the keystroke logging information includes a source indicator associated with at least a portion of the search query.

5. The one or more computer-readable storage hardware device of claim 1, wherein at least a portion of the keystroke logging information is discernable from the submitted content.

6. The one or more computer-readable storage hardware device of claim 5, wherein the keystroke logging information comprises formatting data associated with the search query.

7. The one or more computer-readable storage hardware device of claim 1, wherein the at least one item further comprises an advertisement.

8. The one or more computer-readable storage hardware device of claim 1, wherein the instructions are further configured to transmit the at least one item for presentation on a search engine results page.

9. The one or more computer-readable storage hardware device of claim 1, wherein the keystroke logging information is not discernable from the search query.

10. A method being performed by one or more computing devices including at least one processor, the method for utilizing keystroke logging to determine items for presentation, the method comprising:
    receiving a search query including submitted content and keystroke logging information, the keystroke logging information being captured between engagement with a search query input region and execution of a search query;
    receiving keystroke logging information associated with the search query, the keystroke logging information being captured between engagement with a search query input region and execution of a search query; and
    determining at least one of a search result and an advertisement for presentation in response to the received search query, the at least one of the search result and the advertisement being determined, at least in part, based upon the keystroke logging information.

11. The method of claim 10, wherein the keystroke logging information is not discernable from the search query.

12. The method of claim 11, wherein the keystroke logging information includes at least one indication of a query processing operation.

13. The method of claim 11, wherein the keystroke logging information includes a source indicator associated with at least a portion of the search query.

14. The method of claim 10, wherein at least a portion of the keystroke logging information is discernable from the search query.

15. The method of claim 14, wherein the keystroke logging information comprises formatting data associated with the search query.

16. The method of claim 10,
    wherein determining at least one of a search result and an advertisement for presentation in response to the received search query comprises determining at least one search result,
    and wherein determining the at least one search result comprises ranking the at least one search result among a plurality of other search results based, at least in part, on the keystroke logging information.

17. A system for utilizing keystroke logging to determine items for presentation, the system comprising:
    a search engine having one or more processors and one or more computer storage devices; and
    a data store coupled with the search engine,
    wherein the search engine:

receives an input search query including submitted content and keystroke logging information, the keystroke logging information being captured between engagement with a search query input region and execution of a search query;

determines a plurality of potential search results based, at least in part, on the keystroke logging information;

ranks at least a portion of the determined plurality of potential search results based, at least in part, on the keystroke logging information; and transmits at least a portion of the ranked plurality of potential search results for presentation in response to the received search query.

18. The system of claim 17, wherein the search engine further determines at least one advertisement for presentation with the ranked plurality of potential search results, the at least one advertisement being determined based, at least in part, on the keystroke logging information.

19. The system of claim 17, wherein the keystroke logging information is not discernable from the submitted content.

20. The system of claim 17, wherein at least a portion of the keystroke logging information is discernable from the submitted content.

\* \* \* \* \*